C. P. BALLARD.
SHEEP COLLAR.
APPLICATION FILED AUG. 18, 1909.
948,407.
Patented Feb. 8, 1910.
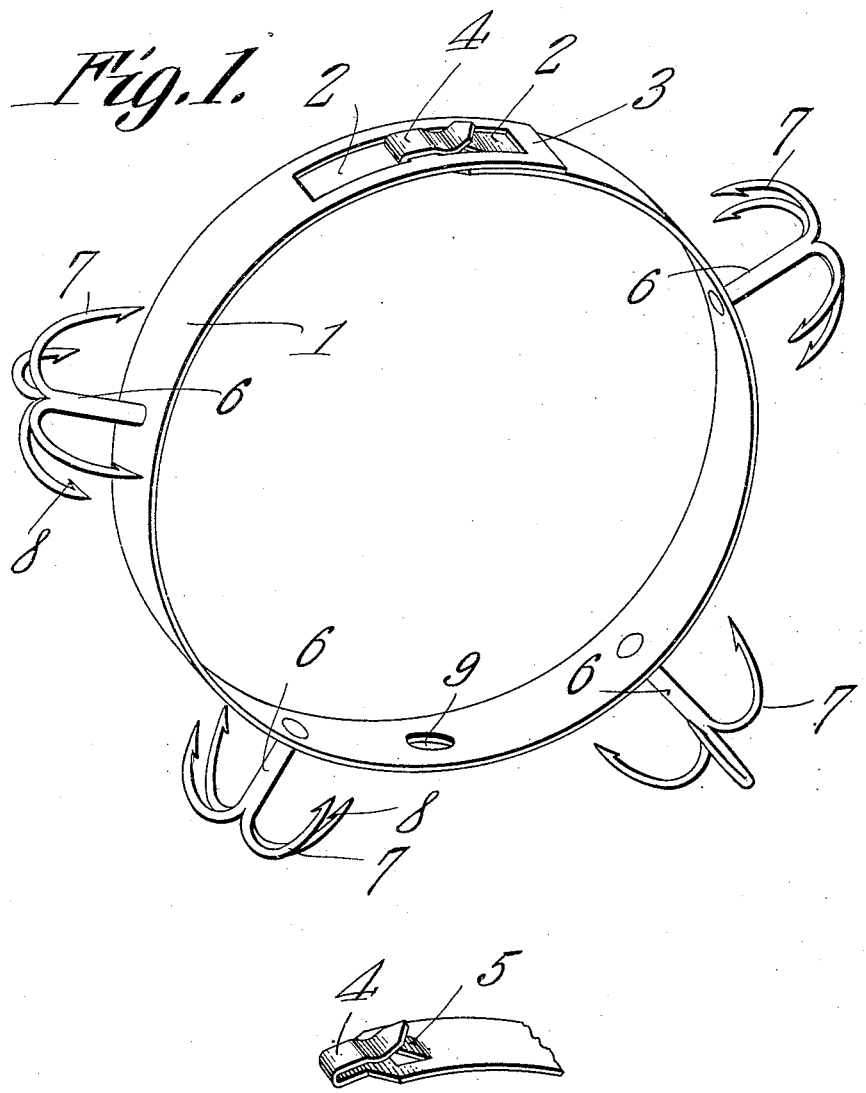
Inventor
Cullum P. Ballard.

UNITED STATES PATENT OFFICE.

CULLUM PRESTON BALLARD, OF HUNTERS SPRINGS, WEST VIRGINIA, ASSIGNOR OF ONE-THIRD TO JOHN P. COPELAND AND ONE-THIRD TO WILL M. COMER, OF HUNTERS SPRINGS, WEST VIRGINIA.

SHEEP-COLLAR.

948,407.      Specification of Letters Patent.      Patented Feb. 8, 1910.

Application filed August 18, 1909. Serial No. 513,467.

*To all whom it may concern:*

Be it known that I, CULLUM P. BALLARD, a citizen of the United States, residing at Hunters Springs, in the county of Monroe and State of West Virginia, have invented a new and useful Sheep-Collar, of which the following is a specification.

This invention relates to collars for sheep or other small live stock.

Persons engaged in raising live stock such as sheep often meet with considerable loss from wild dogs, wolves and the like which attack the sheep and kill them by biting their throats.

One of the objects of the present invention is to provide a collar of novel form designed to be worn by a sheep or other small animal and which includes a novel arrangement of devices designed to trap the attacking animal and not only prevent it from injuring the stock but also prevent it from escaping after the attack has been made.

Another object is to provide a collar of this type which is cheap to manufacture and can be quickly adjusted to fit snugly about necks of different sizes.

With these and other objects in view, the invention consists of certain novel details of construction and the combinations of parts such as hereinafter more fully described and pointed out in the claims.

In the accompanying drawings the preferred form of the invention has been shown.

In said drawings:—Figure 1 is a perspective view of a collar embodying the present improvements. Fig. 2 is a detail view of the hooked member of the fastener.

Referring to the figures by characters of reference, 1 designates a band preferably formed of spring metal and one end of this band has a desired number of openings 2 therein forming cross bars 3. Any one of these bars is designed to be engaged by a hook 4 formed at the other end of the band and by a retaining lip 5 outstruck from the band and under the hook so as to prevent the engaged bar 3 from being accidentally forced out of the hooks 4.

Extending from the band at desired intervals are stems 6, each of which is provided at its outer end with a cluster of hooks 7 having one or more barbs 8 thereon, the points of the hooks being directed toward the band. The stems 6 may be attached to the band either by riveting them thereto or by utilizing suitable fastening devices.

A collar such as herein described can be quickly adjusted about the neck of a sheep or other animal and when it is in position thereon the stems 6 will extend therefrom along radial lines, the points of the hooks 7 being held at sufficient distances from the neck to prevent injury to the animal thereby. When a hostile animal assails the sheep or other stock wearing the collar, its first attack will be directed toward the throat in an endeavor to sever the jugular vein. Instead of snapping its jaws upon the flesh of the neck, however, they will engage with the hooks on one of the stems 6 and these hooks will enter the jaws and the barbs will prevent the hooks from being withdrawn. The animal will thus be held a captive and cannot injure the stock attacked by it. When the collar is worn by sheep or other animals having long wool it will be practically concealed from view and cannot therefore be intentionally avoided by the attacking animal.

It is to be understood that the collar herein described can be varied both as to the arrangement and construction of the parts without departing from the spirit or sacrificing the advantages of the invention. For example, and as shown in Fig. 1, an opening 9 may be formed in the bottom portion of the band 1 so as to permit a bell to be conveniently attached to the collar.

What is claimed is:—

1. A collar including a band, and a cluster of inwardly directed hooks connected to the outer face of the band.

2. A collar including a band, a stem outstanding therefrom, and inwardly directed hooks upon the stem.

3. A collar including a band, a stem outstanding therefrom, and a cluster of inwardly directed hooks upon the outer end of the stem.

4. A collar including a band, a stem outstanding therefrom, a series of inwardly directed hooks upon the outer end of the stem, and barbs upon the hooks.

5. A collar including a band, and a series of stems radiating therefrom, a plurality of hooks upon the outer end of each stem and directed toward the band.

6. A collar including an adjustable band, a plurality of stems radiating therefrom and fixedly connected thereto, a series of hooks upon the outer end of each stem and directed toward the band, and barbs upon the hooks.

7. A collar including an elastic band, means for adjustably connecting the ends of the band, stems fixedly connected to and radiating from the band, hooks upon the outer ends of the stems and directed toward the band and barbs upon the hooks.

In testimony that I claim the foregoing as my own, I have hereto affixed my signature in the presence of two witnesses.

CULLUM PRESTON BALLARD.

Witnesses:
R. H. ARNATT,
I. N. BALLARD.